May 22, 1945.  R. A. GOEPFRICH  2,376,685
BRAKE ACTUATING MEANS
Filed Aug. 16, 1941  3 Sheets-Sheet 1

INVENTOR
RUDOLPH A. GOEPFRICH
BY
M. W. M<sup>c</sup>Conkey
ATTORNEY

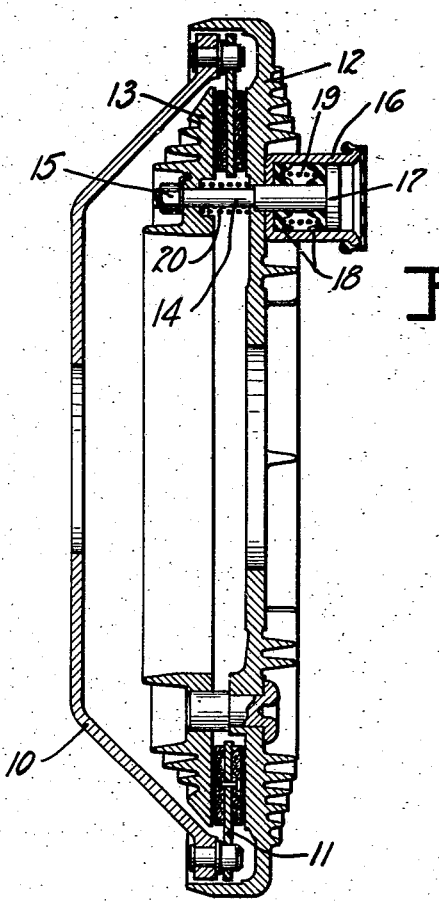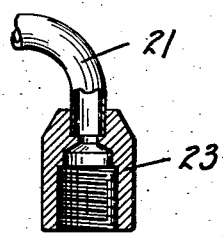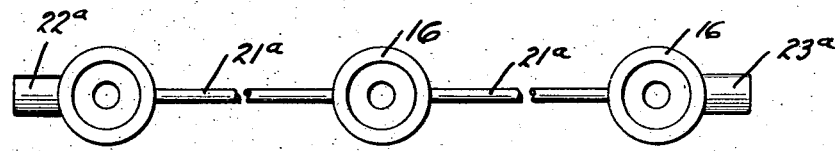

May 22, 1945.　　　R. A. GOEPFRICH　　　2,376,685
BRAKE ACTUATING MEANS
Filed Aug. 16, 1941　　　3 Sheets-Sheet 3
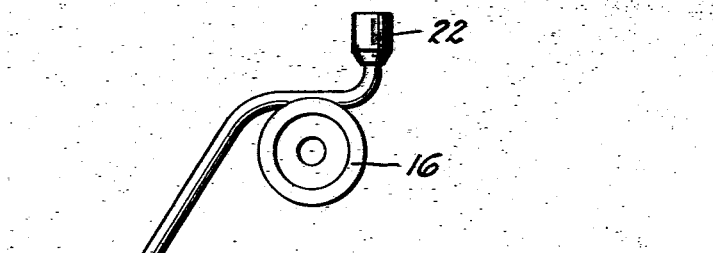
FIG. 4
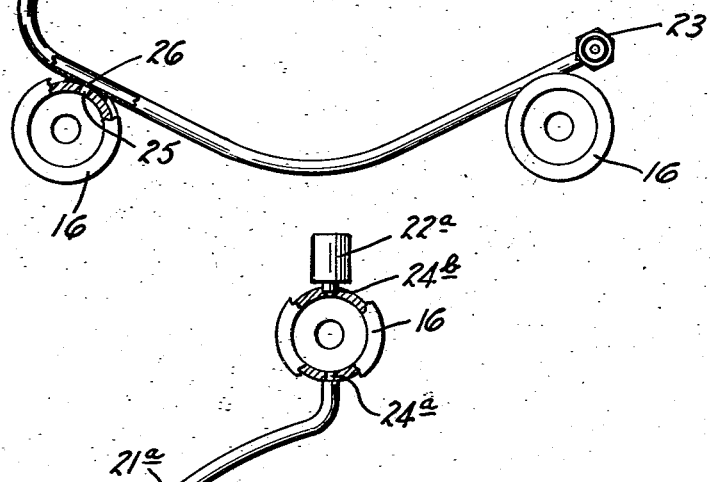
FIG. 7
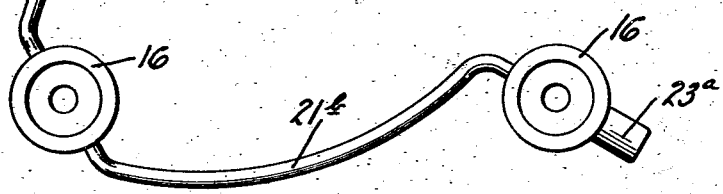
INVENTOR
RUDOLPH A. GOEPFRICH
BY
ATTORNEY Patented May 22, 1945

2,376,685

UNITED STATES PATENT OFFICE 2,376,685

BRAKE ACTUATING MEANS

Rudolph A. Goepfrich, South Bend, Ind., assignor to Bendix Aviation Corporation, South Bend, Ind., a corporation of Delaware Application August 16, 1941, Serial No. 407,101

8 Claims. (Cl. 188—152)

This application relates to friction devices and particularly to friction devices which are actuable by liquid.

My invention will be illustrated and described with reference to a brake of the disk type. It will be appreciated that devices other than brakes might incorporate my invention and likewise that, in the field of brakes, there are other types of brakes which might advantageously use the principles described and applied in this application.

There are certain desirable qualities inherent in disk brakes such as smoothness of action and extensive friction surface with consequent lower heat per unit of lining area. However, on the other side of the ledger are problems which have thus far prevented the widespread commercial adoption of disk brakes for actual everyday use.

The wrapping action of the drum in a brake of the drum-and-shoe type is not present in a disk brake. Since this wrapping action is at times an important factor in developing brake-applying force in drum brakes, it is desirable to find some substitute means for exerting an effective applying force in disk brakes.

One way of building up the applying force in a disk brake is the inclusion of a self-energization feature in the brake so that the torque exerted by the rotating member when it is being frictionally braked will tend to increase the applying force.

Use of self-energizing disk brakes may in itself raise problems due to danger of locking and need for effective releasing means. Consequently a disk brake which is effective without self-energization is highly desirable.

It is my chief object to provide a disk brake which may attain a high effectiveness without self-energization. A high effectiveness is attained when the ratio of brake applying force or pressure tending to move the friction elements against one another to unit line pressure in the conduits carrying pressure liquid is relatively high.

To provide an effective brake, I have used a plurality of liquid containers or cylinders, each of them exerting a brake applying force on the friction elements in accordance with the line pressure existing in the liquid conduits connected to the cylinders. The total applying force or pressure for any given unit line pressure is directly proportional to the number of cylinders.

The use of a plurality of brake applying cylinders might be prohibitively expensive except for my provision of a brake assembly which has stamped cylinders welded or brazed to a formed tube. The substitution of stamped cylinders for cast cylinders effects a substantial saving in manufacturing cost with the result that it is possible to use a larger number of cylinders with a larger total piston area on which brake applying pressure is exerted.

The end result of the above is the provision of a highly effective and dependable brake which at the same time is very smooth and controllable in operation.

The saving in manufacturing cost results not only from the substitution of the simple stamping operation for the casting process but also from the avoidance of high machining costs. In cast iron cylinders of the type conventionally used any bosses or nipples, for example, to accommodate the inlet passage and bleeder screw, are cast integral with the body and they have to be carefully machined. The use of stamped steel cylinders in place of cast iron cylinders makes possible a thinner cylinder wall which can be punched or drilled in a single operation. Cast iron cylinders do not lend themselves readily to such handling.

In handling the fittings or bosses, any machining operations which must be performed on them are more easily performed when the fittings are apart from the cylinder than when they are cast integral with it. In line with this, an advantage is gained by forming the necessary bosses and tubes separately from the stamped cylinders and then welding or brazing them to the cylinders, all the parts being secured to all the cylinders in a single operation.

Other features and advantages of my invention will become apparent during the course of the following description in which reference is had to the accompanying drawings.

In the drawings:

Figure 2 is a vertical section taken on the line 2—2 of Figure 1;

Figure 4 shows the brake applying means and fluid carrying means of Figures 1, 2 and 3 after the fluid carrying means or tube has been bent;

Figure 5 is a close-up showing the end of the tube of Figure 4 connected to a fitting;

Figure 6 shows a modification of the wheel cylinder and conduit assembly of Figure 4, the said assembly being shown as it appears before the cylinders are welded or brazed to the tubes and before the tube has been bent; and Figure 7 shows the device of Figure 6 after the tube has been bent and when the assembly is ready to be positioned on the brake.

Figure 1:
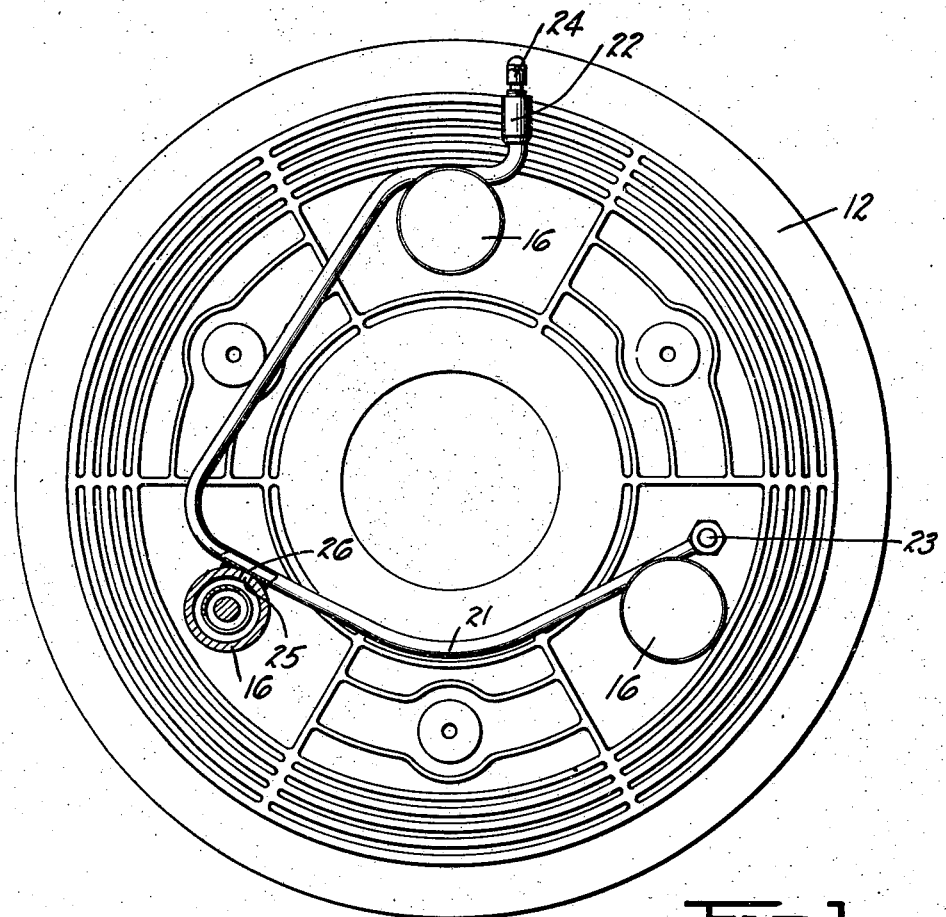
Figure 1 is an elevation showing a disk brake assembly incorporating my invention and showing a hydraulic brake applying cylinder in section.

In Figures 1 and 2, I have illustrated a disk brake assembly incorporating my invention. As shown, said brake assembly includes a rotatable drum 10 having associated therewith a rotor disk 11 faced with frictional lining material, a stationary supporting member 12, and non-rotatable axially movable disk 13. The rotatable disk 11 extends between the disk 13 and the supporting member 12, so that the rotation of the disk may be impeded and stopped when the axially movable disk 13 is moved toward the supporting member 12 to clamp the rotatable disk 11 therebetween. A plurality of rods 14 are connected as by nuts 15 to the axially movable disk 13. The rods pass through openings in the supporting member 12 and into hydraulic cylinders 16 wherein they are connected to pistons 17 which are reciprocable in the cylinders 16. Packings 18 are provided to prevent the escape of fluid from cylinders 16 and light springs 19 are provided in each cylinder tending to move the piston away from the supporting member. Springs 20 are compressed between the supporting member and the axially movable disk 13 adjacent each rod 14 in order to hold the disk 13 in brake released position.

The cylinders 16 are formed by using the stamping process referred to as drawing and have the shape of cups with the bottom portion of the cup abutting the supporting member 12 and the top or open portion of the cup serving to admit the piston head when the pistons are inserted in the cylinders. I have shown a brake using three stamped cylinders. Obviously any number of cylinders could be utilized without departing from my invention, but it has been found that three is a satisfactory number. In the brake assembly (see Figure 1) the cylinders are positioned around a circumference of the brake supporting member 12, each one approximately 120° from the others.

Before the cylinders are assembled with the brake, they may be welded or brazed to a tube 21. The tube 21 interconnects all of the cylinders and also serves to connect them to a source of fluid pressure. At one end of the tube, a fitting 22 is provided, preferably welded or brazed to the end of the tube and at the other end of the tube a fitting 23 is welded or brazed. The fitting 22, which is preferably located higher than any other portion of the tube, accommodates a bleeder screw 24 and fitting 23 is connected to a fluid conduit (not shown) which leads to a source of fluid under pressure.

Openings 25 are punched, drilled or otherwise provided in the cylinders 16, and complementary openings 26 are provided in the tube 21. Then the cylinders are welded to the tube in such position that the openings 25 and 26 are in alignment so that the tube communicates with the interior of each of the cylinders.

Figure 3:
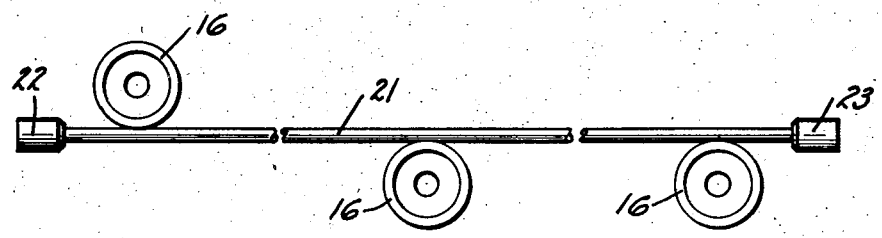
Figure 3 is a view showing the brake applying means and fluid carrying means of Figures 1 and 2 before assembly.

The welding operation to secure the tube to the cylinder is preferably done before the tube has been bent. As illustrated in Figure 3, the cylinders may be placed adjacent the openings in the straight tube 21. In order to assure a satisfactory welding operation, it is advisable to tack weld the cylinders to the tube before the final welding or brazing operation.

The assembly of tube and cylinders is put into a furnace having an atmosphere of hydrogen or the like to weld or braze the parts together in the well known manner. After this is done, the tube may be bent to the desired shape and the whole tube and cylinder assembly may be assembled with the brake in such a manner that the tube is tangent to each of the cylinders at or near the highest point of the cylinder as it is positioned in the assembled brake. It is not necessary that the tube bending be done after the welding process but it is desirable. One reason being that a given amount of space in a welding furnace can accommodate a larger number of tube and cylinder assemblies when the assemblies are in the straight or single line position. During the time the cylinders are being welded to the tube, the fittings 22 and 23 may be welded to the ends of the tube as illustrated in Figure 5.

In Figures 6 and 7, I have illustrated a modification of the tube and cylinder assembly which is probably even more satisfactory than the tube and cylinder assembly of Figures 3 and 4. In the device of Figures 6 and 7, the ends of tubes 21a and 21b are pressed into openings 24a in the sides of the cylinders 16. Fittings 22a and 23a are likewise pressed into openings 24b in each of the end cylinders. After the assembly has been horizontally formed as shown in Figure 6, it is put through a welding or brazing furnace with the result that the fittings, tubing and cylinders are all welded together to form a unitary assembly. This assembly is then assembled with the brake as shown in Figures 1 and 2.

The method of making a brake assembly disclosed in the present application is claimed in divisional application Serial No. 545,283, filed July 17, 1944.

Although I have described certain specific embodiments of my device, it will be apparent that many modifications of the said device can be made without departing from the scope of my invention. I therefore desire that my invention be limited not by the description or drawings but only by the terms of the appended claims.

I claim:

1. Actuating means for a disk brake comprising a plurality of cup-shaped stampings, each having an opening in the side thereof at approximately its highest point, a bent tube secured to each of the cylinders and having a plurality of openings aligned with the openings in the cylinders, one end of said tube being higher than any other portion of the tube, a bleeder plug in the high end of the tube, and an inlet fitting at the opposite end of the tube.

2. Actuating means for a disk brake comprising a plurality of circumferentially spaced cup-shaped stampings, each having an opening in the side thereof at approximately its highest point, a bent tube secured to each of the cylinders and having a plurality of openings aligned with the openings in the cylinders, one end of said tube being higher than any other portion of the tube, a bleeder plug in the high end of the tube, and an inlet fitting at the opposite end of the tube.

3. Actuating means for a disk brake comprising a plurality of cup-shaped stampings each having an opening in the side thereof at approximately its highest point, a single bent tube secured to all of the cylinders and having a plurality of openings aligned with the openings in the cylinders, one end of said tube being higher than any other portion of the tube, a bleeder plug in the high end of the tube, and an inlet fitting at the opposite end of the tube.

4. Actuating means for a disk brake comprising three circumferentially spaced cup-shaped stampings, tubing connecting said stampings to form a unitary fluid-interconnected assembly, one end of said tubing being located higher than any other portion of said unitary fluid-interconnected assembly, and a bleeder plug in the high end of said tubing.

5. Actuating means for a disk brake comprising three circumferentially spaced cup-shaped stampings, tubing connecting said stampings to form a unitary fluid-interconnected assembly, a weld securing each of the stampings directly to the tubing, one end of said tubing being located higher than any other portion of said unitary fluid-interconnected assembly, and a bleeder plug in the high end of said tubing.

6. Actuating means for a disk brake comprising three circumferentially spaced cup-shaped stampings, tubing consisting of a single bent tube connecting said stampings to form a unitary fluid-interconnected assembly, a weld securing each of the stampings directly to the tubing, one end of said tubing being located higher than any other portion of said unitary fluid-interconnected assembly, and a bleeder plug in the high end of said tubing.

7. Disk brake actuating means comprising a plurality of cup-shaped stampings, and a single bent tube interconnecting said stampings and lying tangent to each of them at or near the highest point of the respective stamping, one end of said tube being higher than any other portion thereof and being provided with a bleed opening.

8. Actuating means for a disk brake comprising a plurality of circumferentially spaced cup-shaped stampings, each having an opening in the side thereof at approximately its highest point, a bent tube secured to each of the cylinders and having a plurality of openings aligned with the openings in the cylinders, a weld securing each of the stampings to the tube, one end of said tube being higher than any other portion of the tube, a bleeder plug in the high end of the tube, and an inlet fitting at the opposite end of the tube.

RUDOLPH A. GOEPFRICH.